US012768987B2

(12) United States Patent
Choi et al.

(10) Patent No.: US 12,768,987 B2
(45) Date of Patent: Oct. 20, 2026

(54) METHOD AND APPARATUS WITH CUT-IN VEHICLE MOVEMENT PREDICTOR

(71) Applicant: SAMSUNG ELECTRONICS CO., LTD., Suwon-si (KR)

(72) Inventors: Sungdo Choi, Suwon-si (KR); Seung Tae Khang, Suwon-si (KR); Jong-Sok Kim, Suwon-si (KR); Jinyong Jeon, Suwon-si (KR); Young Rae Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 507 days.

(21) Appl. No.: 18/321,351

(22) Filed: May 22, 2023

(65) Prior Publication Data

US 2024/0125925 A1 Apr. 18, 2024

(30) Foreign Application Priority Data

Oct. 14, 2022 (KR) ........................ 10-2022-0132349

(51) Int. Cl.
*G01S 13/931* (2020.01)
*G01S 7/35* (2006.01)
(Continued)

(52) U.S. Cl.
CPC ............ *G01S 13/931* (2013.01); *G01S 7/356* (2021.05); *G01S 13/42* (2013.01); *G01S 13/584* (2013.01)

(58) Field of Classification Search
CPC ........ G01S 13/931; G01S 7/356; G01S 13/42; G01S 13/584; G01S 2013/93271;
(Continued)

(56) References Cited

U.S. PATENT DOCUMENTS 7,489,265 B2 * 2/2009 Egri ...................... G01S 13/878 342/45
2016/0284213 A1 * 9/2016 Cao ...................... G01S 13/584
(Continued)

FOREIGN PATENT DOCUMENTS

CN 103529452 A 1/2014
JP 2016-180654 A 10/2016
(Continued)

OTHER PUBLICATIONS

Kellner, Dominik, et al. "Wheel extraction based on micro doppler distribution using high-resolution radar." *2015 IEEE MTT-S International Conference on Microwaves for Intelligent Mobility(ICMIM)*. IEEE, (2015). pp 1-5.

*Primary Examiner* — Vladimir Magloire
*Assistant Examiner* — Ismaaeel A. Siddiquee
(74) *Attorney, Agent, or Firm* — NSIP Law

(57) ABSTRACT

A method of predicting a movement of a cut-in object, including separating a Doppler velocity corresponding to at least one wheel of the cut-in object from radar data based on a velocity of the cut-in object, determining a position of the at least one wheel of the cut-in object based on the Doppler velocity, generating at least one of first movement information related to a horizontal movement of the cut-in object or second movement information related to a moving direction of the cut-in object based on the position of the at least one wheel, and determining a position of the cut-in object based on at least one of the first movement information or the second movement information.

16 Claims, 8 Drawing Sheets

(51) Int. Cl.
*G01S 13/42* (2006.01)
*G01S 13/58* (2006.01)

(58) Field of Classification Search
CPC ...... G01S 7/411; G01S 13/343; G01S 13/589; G01S 7/415; G01S 13/505; G01S 13/536; G01S 13/583; G01S 13/62; B60W 40/04; B60W 50/0097; B60W 2420/408; B60W 2554/4041; B60W 2554/4044
See application file for complete search history.

(56) References Cited

U.S. PATENT DOCUMENTS

| | | | | |
|---|---|---|---|---|
| 2019/0028309 | A1* | 1/2019 | Noda | G01S 13/876 |
| 2019/0318206 | A1* | 10/2019 | Smith | B60W 40/04 |
| 2020/0062255 | A1* | 2/2020 | Fernando | B60W 30/188 |
| 2020/0096595 | A1* | 3/2020 | Kishigami | G01S 7/295 |
| 2021/0011150 | A1* | 1/2021 | Bialer | G01S 13/60 |
| 2022/0212662 | A1* | 7/2022 | Gutmann | B60W 10/04 |
| 2022/0234596 | A1* | 7/2022 | Jefferies | B60W 50/04 |
| 2023/0003873 | A1* | 1/2023 | Hakobyan | G01S 13/9021 |
| 2025/0170955 | A1* | 5/2025 | Fish | B60Q 1/525 |

FOREIGN PATENT DOCUMENTS

| | | | |
|---|---|---|---|
| JP | 2018-100899 | A | 6/2018 |
| KR | 10-2018-0072808 | A | 6/2018 |
| WO | WO 2018/235818 | A1 | 12/2018 |

* cited by examiner

METHOD AND APPARATUS WITH CUT-IN VEHICLE MOVEMENT PREDICTOR

CROSS-REFERENCE TO RELATED APPLICATIONS

This application claims the benefit under 35 USC § 119(a) of Korean Patent Application No. 10-2022-0132349, filed on Oct. 14, 2022, in the Korean Intellectual Property Office, the entire disclosure of which is incorporated herein by reference for all purposes.

BACKGROUND

1. Field

The following description relates to a method and apparatus for predicting a position of a cut-in vehicle.

2. Description of Related Art

Advanced driver-assistance systems (ADAS) improve a driver's safety and convenience and avoid dangerous situations by using sensors mounted inside or outside vehicles.

Sensors used in an ADAS may include, for example, a camera, an infrared sensor, an ultrasonic sensor, a light detection and ranging (lidar), and a radar. Among these sensors, the radar may stably measure an object in a vicinity of a vehicle regardless of a surrounding environment, such as weather, in comparison to optical-based sensors.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a processor-implemented method of predicting a movement of a cut-in object, the method including separating a Doppler velocity corresponding to at least one wheel of the cut-in object from radar data based on a velocity of the cut-in object, determining a position of the at least one wheel of the cut-in object based on the Doppler velocity, generating at least one of first movement information related to a horizontal movement of the cut-in object or second movement information related to a moving direction of the cut-in object based on the position of the at least one wheel, and determining a position of the cut-in object based on at least one of the first movement information or the second movement information.

The method may include identifying the cut-in object based on the radar data.

The radar data may include a radio frequency signal reflected from the cut-in object from among pieces of radar data obtained from a radar device attached to a driving vehicle.

The radar data may be obtained by a frequency-modulated continuous-wave (FMCW) radar using a frequency modulated (FM) signal having a frequency that changes with time.

The identifying of the cut-in object may include calculating a distance to a plurality of points of the cut-in object based on the radar data, calculating a velocity of each of the plurality of points based on the radar data, identifying a region where the cut-in object may be positioned in a target region based on the distance and the velocity of each of the plurality of points, calculating a direction of arrival (DOA) of each of the plurality of points, and generating a three-dimensional (3D) coordinate system using the distance, the velocity, and the DOA of each of the plurality of points.

The calculating of the distance may include calculating the distance to each of the plurality of points of the cut-in object through distance fast Fourier transform (FFT) based on the radar data.

The calculating of the velocity may include calculating the velocity of each of the plurality of points through Doppler FFT based on the radar data.

The method may include transforming the region where the cut-in object may be positioned in the 3D coordinate system into a radar data coordinate system using time, frequency, and velocity as axes.

The calculating of the velocity of the cut-in object may include clustering points adjacent to each other from among the plurality of points in the region of the cut-in object, and calculating the velocity of the cut-in object based on a velocity corresponding to the clustered points.

The calculating of the velocity of the cut-in object may include calculating the velocity of the cut-in object based on a statistical value of the velocity corresponding to each of the clustered points.

The identifying of the region where the cut-in object is positioned may include identifying the region where the cut-in object is positioned using constant false alarm rate (CFAR) detection.

The separating of the Doppler velocity corresponding to the at least one wheel may include separating the Doppler velocity corresponding to the at least one wheel in a radar data coordinate system based on the velocity of the cut-in object.

The separating of the Doppler velocity corresponding to the at least one wheel may include determining, as the Doppler velocity, a velocity between the velocity of the cut-in object and a value obtained by multiplying a ratio by the velocity of the cut-in object.

The first movement information may be determined based on a distance between a driving vehicle and two wheels of the cut-in object positioned at a same side of the cut-in object.

The method may include controlling the driving vehicle by applying a greater weight to the first movement information than to the second movement information, in response to a distance between a driving vehicle and the cut-in object being greater than or equal to a threshold.

The method may include controlling a driving vehicle by applying a greater weight to the second movement information than to the first movement information, in response to the velocity of the cut-in object being less than or equal to a threshold.

The method may include controlling a driving vehicle based on the position of the cut-in object.

In another general aspect, there is provided an electronic device including a radar device configured to provide radar data, and a processor configured to separate a Doppler velocity corresponding to at least one wheel of a cut-in object from the radar data based on a velocity of the cut-in object, determine a position of the at least one wheel of the cut-in object based on the Doppler velocity, generate at least one of first movement information related to a horizontal movement of the cut-in object or second movement information related to a moving direction of the cut-in object based on the position of the at least one wheel, and determine a position of the cut-in object based on at least one of the first movement information or the second movement information.

In another general aspect, there is provided a processor-implemented method including identifying radar data reflected from a cut-in object, determining a Doppler velocity corresponding to at least one wheel of the cut-in object from the radar data, determining a position of the at least one wheel of the cut-in object based on the Doppler velocity, generating at least one of a horizontal movement of the cut-in object or a moving direction of the cut-in object based on the position of the at least one wheel, and determining a position of the cut-in object based on at least one of the horizontal movement or the moving direction of the cut-in object.

At least one wheel may include a first wheel and a second wheel, and the moving direction of the cut-in object may be based on an angle formed by the first wheel and the second wheel with a direction of the horizontal movement of the cut-in object.

The Doppler velocity corresponding to the at least one wheel may be greater than a velocity of the cut-in object.

Other features and aspects will be apparent from the following detailed description, the drawings, and the claims.

Figure 1:
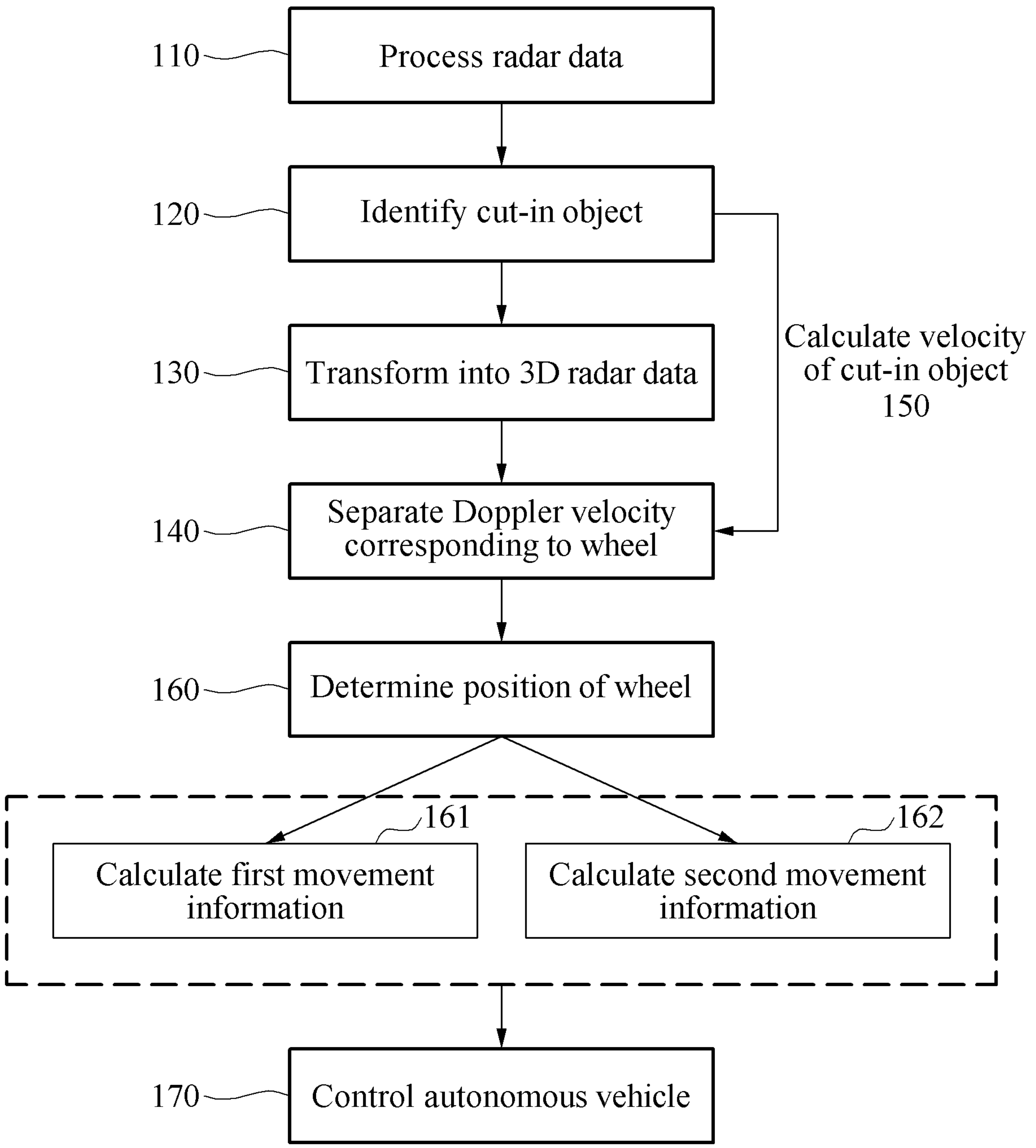
FIG. 1 illustrates an example of a method of determining a position of a cut-in object.

Throughout the drawings and the detailed description, unless otherwise described or provided, the same or like drawing reference numerals will be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as “first,” “second,” and “third”, or A, B, (a), (b), and the like may be used herein to describe various members, components, regions, layers, portions, or sections, these members, components, regions, layers, portions, or sections are not to be limited by these terms. Each of these terminologies is not used to define an essence, order, or sequence of corresponding members, components, regions, layers, portions, or sections, for example, but used merely to distinguish the corresponding members, components, regions, layers, portions, or sections from other members, components, regions, layers, portions, or sections. Thus, a first member, component, region, layer, portions, or section referred to in the examples described herein may also be referred to as a second member, component, region, layer, portions, or section without departing from the teachings of the examples.

Throughout the specification, when a component or element is described as being “connected to,” “coupled to,” or “joined to” another component or element, it may be directly “connected to,” “coupled to,” or “joined to” the other component or element, or there may reasonably be one or more other components or elements intervening therebetween. When a component or element is described as being “directly connected to,” “directly coupled to,” or “directly joined to” another component or element, there can be no other elements intervening therebetween. Likewise, expressions, for example, “between” and “immediately between” and “adjacent to” and “immediately adjacent to” may also be construed as described in the foregoing. As used herein, the term “and/or” includes any and all combinations of one or more of the associated listed items. For example, “A and/or B” may be interpreted as “A,” “B,” or “A and B.”.

The singular forms “a,” “an,” and “the” are Intended to refer to the plural forms as well, unless the context clearly indicates otherwise. It will be further understood that the terms “comprises/comprising” and/or “includes/including” when used herein, specify the presence of stated features, integers, steps, operations, elements, and/or components, but do not preclude the presence or addition of one or more other features, integers, steps, operations, elements, components and/or groups thereof. However, the use of the term “may” herein with respect to an example or embodiment, e.g., as to what an example or embodiment may include or implement, means that at least one example or embodiment exists where such a feature is included or implemented, while all examples are not limited thereto.

Unless otherwise defined, all terms used herein including technical or scientific terms have the same meaning as commonly understood by one of ordinary skill in the art to which examples belong and based on an understanding of the disclosure of the present application. Terms, such as those defined in commonly used dictionaries, are to be interpreted as having a meaning that is consistent with their meaning in the context of the relevant art and the disclosure of the present application, and are not to be interpreted in an idealized or overly formal sense unless expressly so defined herein.

According to examples, a processor may execute, for example, software (e.g., a program) to control at least one other component (e.g., a hardware or software component) of an electronic device connected to the processor, and may perform various data processing or computation. In an example, as at least a part of data processing or computation, the processor may store a command or data received from the other component in a volatile memory, process the command or the data stored in the volatile memory, and store result data in a non-volatile memory. In an example, the processor may include a main processor (e.g., a central processing unit (CPU) or an application processor (AP)), or an auxiliary processor (e.g., a graphics processing unit (GPU), a neural processing unit (NPU), an image signal processor (ISP), a sensor hub processor, or a communication processor (CP)) that is operable independently from, or in conjunction with the main processor. For example, when the electronic device includes the main processor and the auxiliary processor, the auxiliary processor may be adapted to consume less power than the main processor or to be specific to a specified function. The auxiliary processor may be implemented separately from the main processor or as a part of the main processor.

The examples described below may be implemented as, or in, various types of computing devices, such as, a personal computer (PC), a data server, or a portable device. In an example, the portable device may be implemented as a laptop computer, a mobile phone, a smart phone, a tablet PC, a mobile internet device (MID), a personal digital assistant (PDA), an enterprise digital assistant (EDA), a digital still camera, a digital video camera, a portable multimedia player (PMP), a personal navigation device or portable navigation device (PND), a handheld game console, an e-book, a vehicle, an autonomous vehicles, an intelligent vehicles, or a smart device. In an example, the computing devices may be a wearable device, such as, for example, a smart watch and an apparatus for providing augmented reality (AR) (hereinafter simply referred to as an AR provision device) such as AR glasses, a head mounted display (HMD), various Internet of Things (IoT) devices that are controlled through a network, and other consumer electronics/information technology (CE/IT) devices.

Hereinafter, examples will be described in detail with reference to the accompanying drawings. In the drawings, like reference numerals are used for like elements.

FIG. 1 illustrates an example of a method of determining a position of a cut-in object. The operations of FIG. 1 may be performed in the sequence and manner as shown. However, the order of some operations may be changed, or some of the operations may be omitted, without departing from the spirit and scope of the shown example. Additionally, operations illustrated in FIG. 1 may be performed in parallel or simultaneously. One or more blocks of FIG. 1, and combinations of the blocks, can be implemented by special purpose hardware-based computer that perform the specified functions, or combinations of special purpose hardware and instructions, e.g., computer or processor instructions. For example, operations of the method may be performed by a computing apparatus (e.g., processor 810 in FIG. 8).

Hereinafter, a vehicle may refer to any mode of transportation, delivery, or communication such as, for example, for example, an automobile, a truck, a tractor, a scooter, a motorcycle, a cycle, an amphibious vehicle, a snowmobile, a boat, a public transit vehicle, a bus, a monorail, a train, a tram, an autonomous vehicle, an unmanned aerial vehicle, a bicycle, a drone, and a flying object such as an airplane.

A road may refer to a path where vehicles pass. The road may include various types of roads, such as an expressway, a national highway, a local road, a national expressway, a rural dirt road, driveway, and the like. The road may include one or more lanes. A lane may be a division of a road marked off with painted lines or other markings and intended to separate single lines of traffic according to speed or direction. The driving road may refer to a road on which the vehicle is being driven. The lane or driving lane may refer to a lane on which the vehicle is being driven.

In some examples, a position and direction (e.g., a moving direction) of a cut-in object (e.g., a cut-in vehicle) may be predicted through trajectory analysis. A cut-in object may refer to an object that enters a lane, in which a vehicle is currently traveling. In some examples, the cut-in object may be an object among a plurality of objects, such as other vehicles, bicycles, and pedestrians that are traveling in a lane next to the driving vehicle.

In some examples, the vehicle may correspond to, for example, an intelligent vehicle equipped with an advanced driver assistance system (ADAS) and/or an autonomous driving (AD) system. The ADAS and/or AD system of the vehicle may recognize some situations and/or objects while the vehicle is driving and may control an operation of the vehicle or notify a driver of the situations and/or objects on the road or the lane. In addition, the vehicle may obtain various pieces of driving information, such as, for example, the object on the driving road and provide the information to a controller of the vehicle.

Since the trajectory analysis performs calculation by defining a region (e.g., a driving lane) to determine whether the cut-in object enters a driving lane, accuracy of the position and direction of the cut-in object may affect a performance of autonomous driving. For example, the trajectory analysis may be a method of defining a driving region having a margin based on a driving lane and determining whether the cut-in object enters the driving region by using single-shot data of sensor data (e.g., a camera, radar, or lidar).

In some situations, the autonomous vehicle may not perfectly or adequately respond to a case where a vehicle driving in the next lane cuts into a driving lane of the autonomous vehicle. Therefore, predicting a cut-in situation in advance through methods, such as, for example, trajectory tracking of a vehicle and/or object in the next lane may be useful. Also, detecting an accurate position of the cut-in vehicle may be also useful. An electronic device 800 attached to a driving vehicle (e.g., an electronic device 800 of FIG. 8) may estimate position and direction information of surrounding vehicles using sensor data from the autonomous vehicle. However, when a distortion of some sensor data occurs, prediction accuracy of the position and direction information of the surrounding vehicles may decrease. For example, sensor data based on a camera or a lidar sensor may be distorted depending on weather conditions.

Accordingly, a method of predicting a position and direction of a cut-in object using radar data will be described below in detail.

In some examples, in operation 110, the processor 810 may process radar data. The processor 810 may identify a cut-in object based on the radar data. The radar data may be obtained according to a frequency-modulated continuous-wave (FMCW) radar method of generating a frequency modulated (FM) signal having a frequency that changes with time. The radar data is further described in detail with reference to FIG. 2.

In some examples, the radar data may be radar data including a radio frequency signal reflected from a cut-in object among pieces of radar data obtained from a radar device attached to a driving vehicle. In some examples, the processor 810 may separate the radio frequency signal reflected from the cut-in object from the radar data received from the radar device. The processor 810 may predict a position and direction of the cut-in object by separating the radio frequency signal corresponding to the cut-in object. Accordingly, since the processor 810 uses only the radio frequency signal corresponding to the cut-in object, the amount of computation for calculating the position and direction of the cut-in object may be reduced. Accordingly, through operation 110, the processor 810 may obtain the radar data including the radio frequency reflected from the cut-in object.

In operation 120, the processor 810 may identify the cut-in object based on the radar data including the radio frequency reflected from the cut-in object. Hereinafter, operation 120 will be described in detail.

In some examples, the processor 810 may lower a frequency band of the radar data. The following operation may be performed using the radar data having a lowered frequency band. In some examples, the lowering of the frequency band may be omitted.

The processor 810 may calculate a distance to each of a plurality of points of the cut-in object based on the radar data. The plurality of points may be points included in a point cloud. The point cloud may be a set of points measured on a surface of an object generated by a three-dimensional (3D) laser. For example, the point cloud may be a set of a plurality of points displayed on a cut-in object. The point may be a point existing on the cut-in object. The processor 810 may calculate the position and moving direction of the cut-in object using the plurality of points.

In some examples, the processor 810 may calculate the distance to each of the plurality of points of the cut-in object through methods, such as, for examples, distance fast Fourier transform (FFT) based on the radar data. For example, the distance may be a distance between the driving vehicle and the point of the cut-in object. The distance FFT will be further described below with reference to FIG. 2.

In some examples, the processor 810 may calculate a velocity of each of the plurality of the points based on the radar data. For example, the velocity may be a relative velocity of each of the plurality of points of the cut-in object with respect to the driving vehicle.

Figure 2:
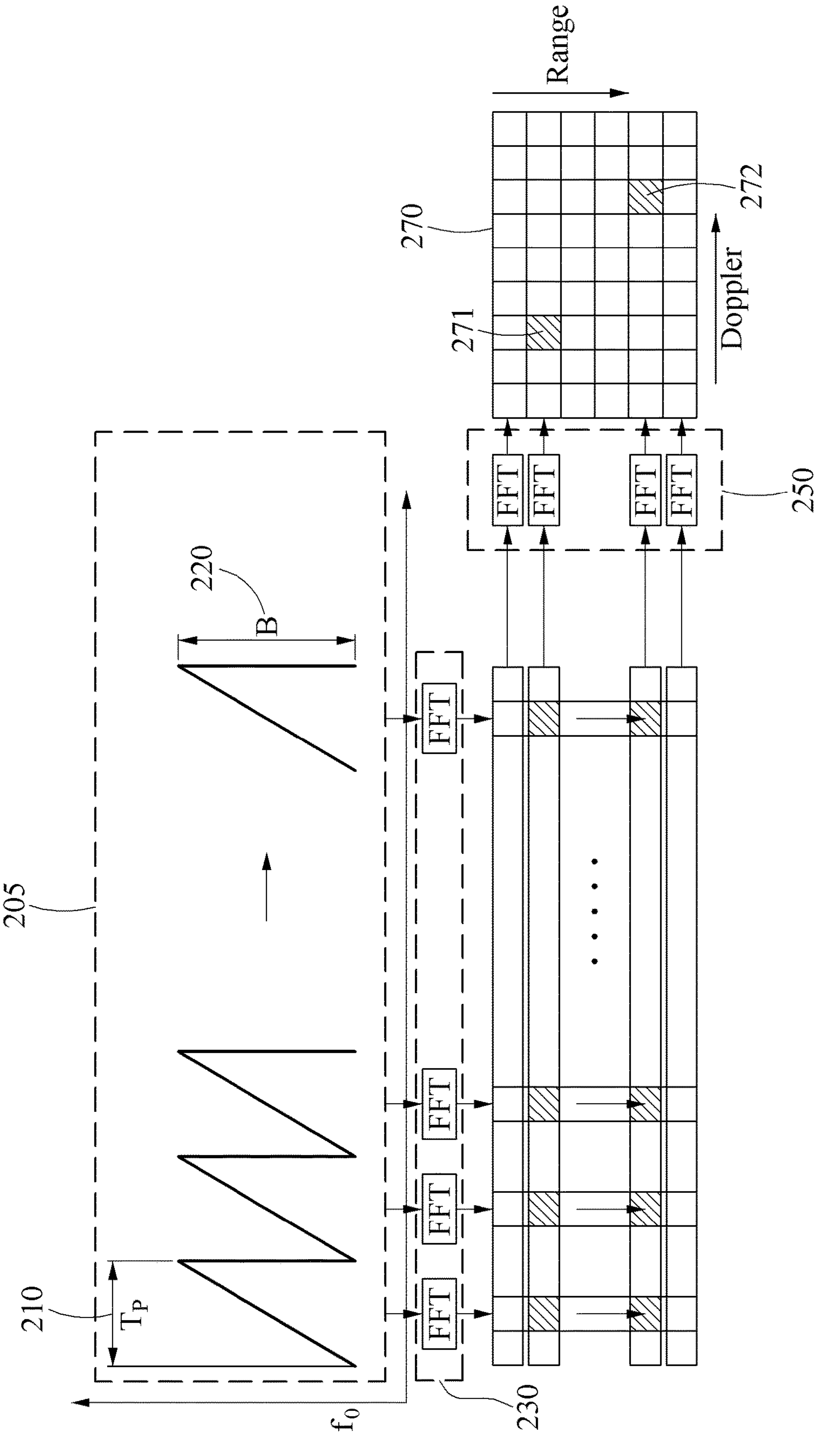
FIG. 2 illustrates an example of a method of calculating a distance to a point and a velocity of the point.

The processor 810 may calculate the velocity of each of the plurality of the points through methods, such as, for example, Doppler FFT based on the radar data. Referring to FIG. 2, the processor 810 may calculate the velocity of each of the plurality of the points by performing the Doppler FFT on a distance FFT result. The Doppler FFT will be further described below with reference to FIG. 2.

In some examples, the processor 810 may identify a region where the cut-in object is positioned in a target region based on the distances and velocities. The processor 810 may generate a range-Doppler map 270 (e.g., the range-Doppler map 270 of FIG. 2) through the distance FFT and Doppler FFT. The range-Doppler map 270 will be further described below with reference to FIG. 2.

In some examples, the processor 810 may identify the region where the cut-in object is positioned through constant false alarm rate (CFAR) detection. In some examples, the processor 810 may identify the region where the cut-in object exists by applying the CFAR detection based on the range-Doppler map 270. The CFAR detection will be further described below with reference to FIG. 2.

In some examples, the processor 810 may calculate a direction of arrival (DOA) of the cut-in object. The processor 810 may calculate a DOA of each of the plurality of points of the cut-in object. The DOA may refer to a direction in which a radar signal reflected from a target (e.g., the cut-in object) is received. The processor 810 may identify the direction in which the target exists with respect to a radar device (e.g., the driving vehicle) using the DOA described above.

In some examples, the processor 810 may calculate the region where the cut-in object exists by using at least one of the velocity, distance, or DOA of each point. For example, the region where the cut-in object exists may be determined based on the distance and angle of each point of the cut-in object with respect to the driving vehicle.

Figure 4:
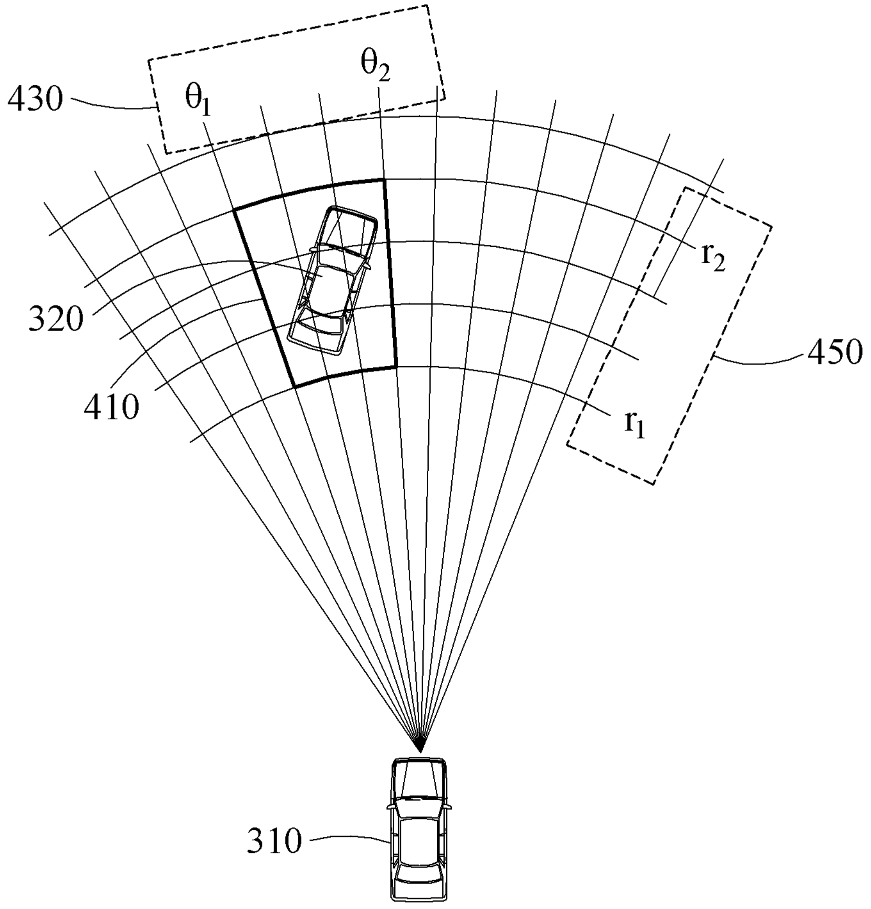
FIG. 4 illustrates an example of a method of identifying a region where a cut-in object is positioned.

Referring to FIG. 4, in a situation where a driving vehicle 310 and a cut-in object 320 exist, the processor 810 may express a region where the cut-in object exists as a distance range 450 and an angle range 430. For example, the distance range 450 in which the cut-in object exists may be $r_1$~$r_2$. In addition, the angle range 430 in which the cut-in object exists may be $\theta_1$~$\theta_2$. Accordingly, the processor 810 may identify a region 410 where the cut-in object exists based on the angle range 430 and the distance range 450.

In some examples, the processor 810 may generate a 3D coordinate system using at least one of the velocity, distance, or DOA of each point. The 3D coordinate system may be a coordinate system having the velocity, distance, and DOA as axes. For example, the distance may be a z-axis, the DOA may be a y-axis, and the velocity may be an x-axis. The directions of the axes described above are merely an example, and examples are not limited thereto.

In some examples, in operation 130, the processor 810 may transform data displayed in the 3D coordinate system into 3D radar data. In some examples, the processor 810 may transform the region in the 3D coordinate system where the cut-in object is positioned, into a radar data coordinate system having time, frequency, and velocity as axes. For example, the radar data coordinate system may be an intermediate frequency (IF) domain. Accordingly, the transforming from the 3D coordinate system into the radar data coordinate system may be an operation of inverse transformation of the region in the 3D coordinate system, where the cut-in object is positioned, into the IF domain. For example, the transforming from the 3D coordinate system into the radar data coordinate system may be beamspace 3D radar transform. According to Equation 1, F may represent the 3D coordinate system, r may represent the distance, θ may represent the DOA, and v may represent the velocity. W may represent the region where the cut-in object exists and may include the angle range 430 and the distance range 450. B may represent the radar data coordinate system, t may represent time, k may represent a frequency, and v may represent the velocity. IFT stands for IF transform.

$$\mathcal{F}(r,\theta,v)*\mathcal{W}(r_1,r_2,\theta_1,\theta_2)\overset{IFT}{\Longrightarrow}B(t,k,v) \quad \text{[Equation 1]}$$

Figure 5:
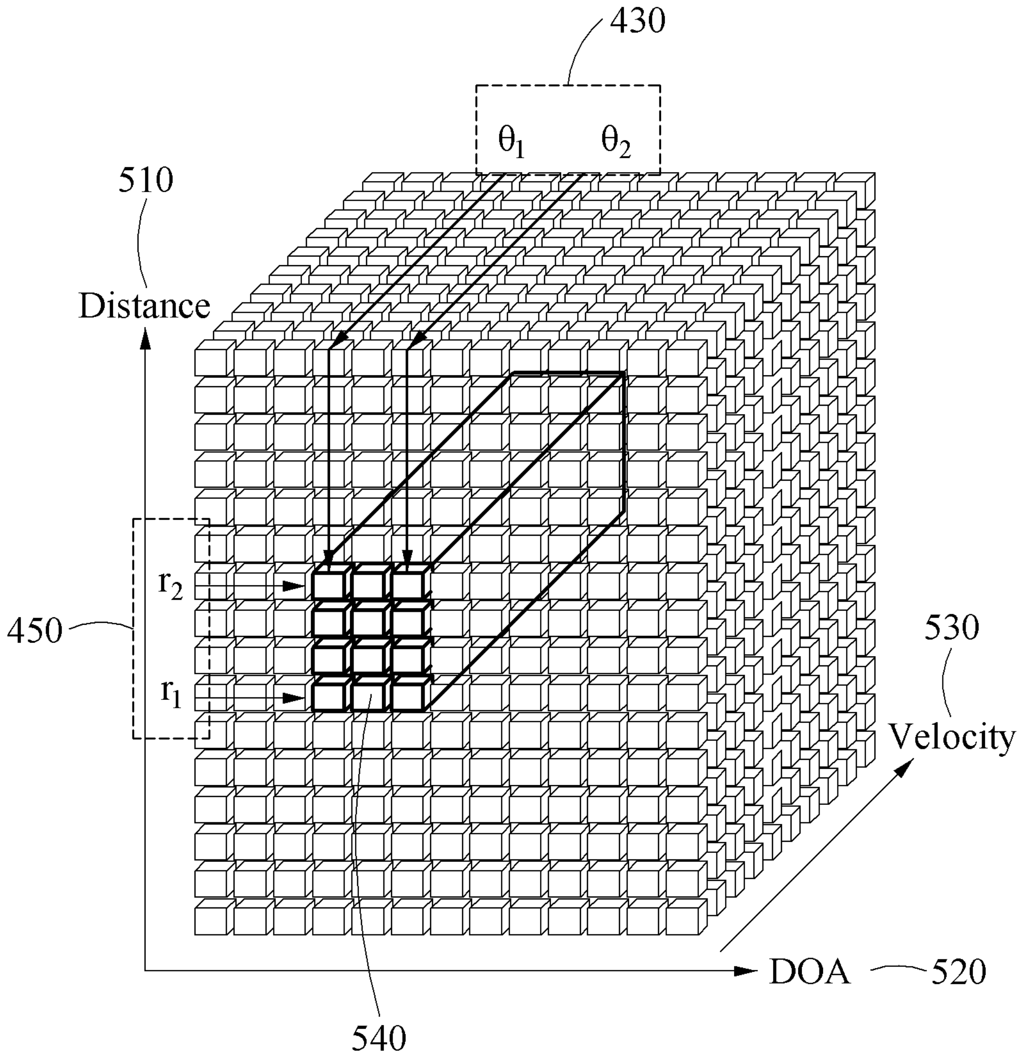
FIG. 5 illustrates an example of a method of transforming a three-dimensional coordinate system into a radar data coordinate system.

FIG. 5 illustrates a 3D coordinate system in which a distance 510 is set as the z-axis, a DOA 520 is set as the y-axis, and a velocity 530 is set as the x-axis. As described above, the processor 810 may express the region where the cut-in object exists as the distance range 450 of $r_1 \sim r_2$ and the angle range 430 of $\theta_1 \sim \theta_2$. The processor 810 may transform only pieces of data (e.g., data 540 of FIG. 5) included in the distance range 450 and the angle range 430 into the radar data coordinate system. For example, the processor 810 may inversely transform the pieces of data included in the distance range 450 and the angle range 430 into the IF domain. Thus, an amount of computation may be reduced because the processor 810 performs the operation of transforming only some pieces of data in the 3D coordinate system.

In operation 150, the processor 810 may calculate the velocity of the cut-in object. The processor 810 may calculate the velocity of the cut-in object based on the region of the cut-in object. As described above, the processor 810 may calculate the distance and velocity of each of the plurality of points through the distance FFT and Doppler FFT. The processor 810 may calculate the velocity of the cut-in object using the velocity corresponding to each point.

The processor 810 may cluster points adjacent to each other in the region of the cut-in object. The points adjacent to each other may be positioned close enough to be identified as the points corresponding to the cut-in vehicle. The processor 810 may calculate the velocity of the cut-in object based on the velocity corresponding to at least one clustered point. The processor 810 may calculate the velocity of the cut-in object based on a statistical value of the velocity corresponding to each of the clustered point. For example, the processor 810 may calculate the velocity of the cut-in object based on at least one of an average value or a median value of the velocity corresponding to each of the clustered points. In another example, the processor 810 may cluster point clouds adjacent to each other in the region of the cut-in object. The processor 810 may calculate the velocity of the cut-in object based on the velocity corresponding to at least one clustered point cloud.

Figure 6:
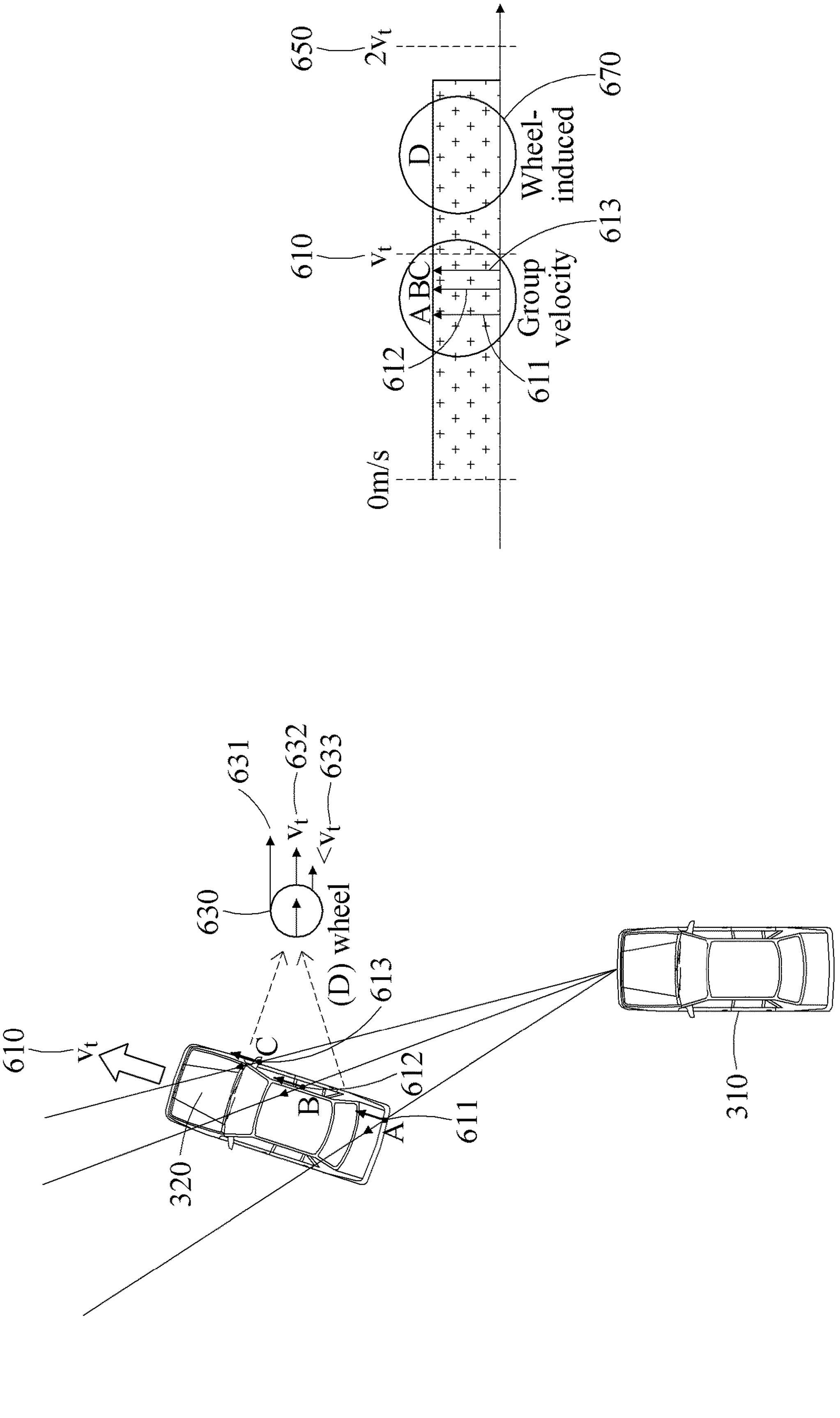
FIG. 6 illustrates an example of a method of separating a Doppler velocity corresponding to wheels.

Referring to FIG. 6, a velocity 610 of the cut-in object may be represented by $v_t$. The clustered points may be points 611 to 613. The processor 810 may determine the velocity 610 of the cut-in object based on the statistical value (e.g., the average value or median value) of the velocities corresponding to the points 611 to 613.

In operation 140, the processor 810 may separate a Doppler velocity corresponding to a wheel based on the velocity 610 of the cut-in object. The processor 810 may separate a Doppler velocity corresponding to at least one wheel of the cut-in object from the radar data based on the velocity of the cut-in object.

In some examples, the Doppler velocity of a signal reflected from a body of the cut-in object may be determined by a relative velocity and azimuth angle with respect to the driving vehicle. For example, in FIG. 6, the Doppler velocity of one point A 611 included in the cut-in object may be represented by Equation 2.

$$v_r^A = v_t \cdot \cos\, \theta_{az}^A \qquad \text{[Equation 2]}$$

$$v_r^A$$

may represent the Doppler velocity of the point A 611, $v_t$ may represent the velocity of the cut-in object, and $$\theta_{az}^A$$

may represent the azimuth angle with respect to the driving vehicle.

In some examples, the Doppler velocity of the signal reflected from the wheel of the cut-in object may generate a Doppler effect diffused by a rotational movement of the wheel. As shown in FIG. 6, a velocity of an upper portion of a wheel 630 may be greater than the velocity 610 of the cut-in object, a velocity of a middle portion of the wheel 630 may be equal to the velocity 610 of the cut-in object, and a velocity of a lower portion of the wheel 630 may be smaller than the velocity 610 of the cut-in object. Therefore, for example, the Doppler velocity corresponding to the wheel may be represented by Equation 3.

$$0 \le v_r^{wheel} \le 2v_t \cdot \cos\, \theta_{az}^{wheel} \qquad \text{[Equation 3]}$$

$$v_r^{wheel}$$

may represent the Doppler velocity of the wheel, $v_t$ may represent the velocity of the cut-in object, and $$\theta_{az}^{wheel}$$

may represent the azimuth angle of the driving vehicle and the wheels of the cut-in object. According to Equation 3, the Doppler velocity of the wheel may be greater than the velocity 610 of the cut-in object. Accordingly, the processor 810 may determine velocities greater than the velocity 610 of the cut-in object as the Doppler velocity corresponding to the wheel.

The processor 810 may separate the Doppler velocity corresponding to the at least one wheel from the radar data coordinate system (e.g., the IF domain) based on the velocity of the cut-in object. In the radar data coordinate system, information corresponding to the points included in the region of the cut-in object may be displayed. Accordingly, the velocity corresponding to each point may be displayed in the radar data coordinate system, and the processor 810 may determine whether the velocity is the Doppler velocity corresponding to the wheel by using the velocity corresponding to the point.

In some examples, Doppler velocity corresponding to the wheel may be determined as shown below. The processor 810 may determine, as the Doppler velocity, a velocity between the velocity of the cut-in object, among velocities corresponding to the plurality of points, and a value obtained by multiplying a the velocity of the cut-in object by a constant. In some examples, the constant may be a predetermined ratio. For example, when the velocity of the cut-in object is $v_t$ the processor 810 may determine the velocity in a range of Equation 4 as the Doppler velocity corresponding to the wheel.

$$v_t \le \text{Dopper Velocity corresponding to wheel} \le C * v_t \qquad \text{[Equation 4]}$$

C may represent a constant ratio. For example, C may be 1.8 or 2, and the examples are not limited thereto. The processor 810 may adjust a value of C to accurately identify points corresponding to wheels.

In operation 160, the processor 810 may determine a position of the wheel. The processor 810 may determine the position of the at least one wheel of the cut-in object based on the Doppler velocity corresponding to the at least one wheel. The processor 810 may perform operations 110 and 120 to determine the position of the wheel. For example, the processor 810 may perform the distance FFT on radar data and the Doppler FFT on a result thereof. Also, the processor 810 may identify the cut-in object through the CFAR detection. The processor 810 may estimate the DOA of each of the plurality of points. The processor 810 may determine velocities included in the range of Equation 4 as the Doppler velocity corresponding to the wheel. The processor 810 may determine the points having the velocity determined as the Doppler velocity corresponding to the wheel to be the points corresponding to the wheels. Accordingly, the processor 810 may calculate the position and direction of the cut-in object based on the points corresponding to the wheels.

In operation 161, the processor 810 may calculate first movement information based on the position of the wheel. The first movement information may be information related to a horizontal movement of the cut-in object. A horizontal direction may be the same direction as a direction of the driving vehicle. Accordingly, the processor 810 may calculate a distance between the driving vehicle and two wheels of the cut-in object based on the points corresponding to the wheels. The processor 810 may calculate a distance between the driving vehicle and the cut-in object using the distance between the driving vehicle and two wheels of the cut-in object. Through this, the processor 810 may predict an accurate distance to the cut-in object by using the points corresponding to the wheels.

The second movement information may be information related to a moving direction of the cut-in object. In operation 162, the processor 810 may calculate the second movement information based on the positions of the wheels. Accordingly, the processor 810 may calculate the moving direction of the cut-in object based on an angle formed by two wheels. In some examples, the and the moving direction of the cut-in object may be based on an angle formed by the two wheels with a direction of the horizontal movement of the cut-in object. Through this, the processor 810 may predict an accurate moving direction of the cut-in object by using the points corresponding to the wheels.

The processor 810 may generate at least one of the first movement information related to the horizontal movement of the cut-in object or the second movement information related to the moving direction of the cut-in object based on the position of at least one wheel.

In operation 170, the processor 810 may control the driving vehicle by applying different weights to each of the first movement information and the second movement information based on at least one of a direction or velocity of the cut-in object that enters a lane of the driving vehicle. A method of controlling the driving vehicle by applying different weights will be further described below with reference to FIG. 7.

FIG. 2 illustrates an example of a method of calculating a distance to a point and a velocity of the point. In some examples, function of a radar will be described for the methods and apparatuses disclosed herein.

The radar device may be, for example, an mmWave radar and may measure a distance to a target by analyzing a change in a waveform of a radar signal and a time of flight (ToF), which is a time until a radiated electric wave returns after being reflected by the target. For reference, compared to an optic-based sensor including a camera, the mmWave radar may detect a target regardless of a change in an external environment, such as fog and rain. In addition, since the mmWave radar has excellent cost performance compared to LiDAR, the mmWave radar may be one of the sensors that may compensate for the aforementioned disadvantages of the optic-based sensor, such as the camera.

For example, the radar device may be implemented as a FMCW radar. The FMCW radar may be robust against external noise.

In some examples, a chirp transmitter may generate the FM signal using frequency modulation models. For example, a chirp transmitter may generate a FM signal by alternately using different frequency modulation models. In some examples, the FM signal may alternately include a chirp sequence signal interval according to a first frequency modulation model and a chirp sequence signal interval according to a second frequency modulation model. In some examples, there may be a frequency difference corresponding to a difference value between a chirp of the first frequency modulation model and a chirp of the second frequency modulation model. Such various chirp sequences of carrier frequencies may be used to extend the range of a maximum measurable Doppler velocity. The Doppler velocity may also be referred to as a radial velocity.

An array antenna may include a plurality of antenna elements. Multiple input multiple output (MIMO) may be implemented through the plurality of antenna elements. In some examples, a plurality of MIMO channels may be formed by the plurality of antenna elements. For example, a plurality of channels corresponding to M×N virtual antennas may be formed through M transmission antenna elements and N reception antenna elements. Here, radar reception signals received through the respective channels may have different phases based on reception directions.

Radar data may be generated based on the radar transmission signal and the radar reception signal. The radar device may transmit the radar transmission signal through the array antenna based on the frequency modulation model and receive the radar reception signal through the array antenna as the radar transmission signal is reflected by a target. Also, the radar device may generate an IF signal based on the radar transmission signal and the radar reception signal. The IF signal may have a frequency corresponding to a difference between a frequency of the radar transmission signal and a frequency of the radar reception signal. The processor 810 may perform a sampling operation on the IF signal, and generate radar data through a result of the sampling.

The processor 810 may generate the range-Doppler map 270 by transforming a chirp sequence signal 205. For example, the processor 810 may perform the FFT on the chirp sequence signal 205. The processor 810 may perform the distance FFT 230 on the chirp sequence signal 205. In addition, the processor 810 may perform Doppler FFT 250 on a distance FFT result. The processor 810 may generate the range-Doppler map 270 using at least one of the distance FFT 230 or the Doppler FFT 250. In FIG. 2, Tp 210 may indicate a chirp period and B 220 may indicate a total frequency deviation of the chirp sequence signal.

The processor 810 may detect at least one of points 271 and 272 from the range-Doppler map 270. For example, the processor 810 may detect the points 271 and 272 through the CFAR detection for the range-Doppler map 270. In some examples, the CFAR detection may be a thresholding-based detection method.

Figure 3:
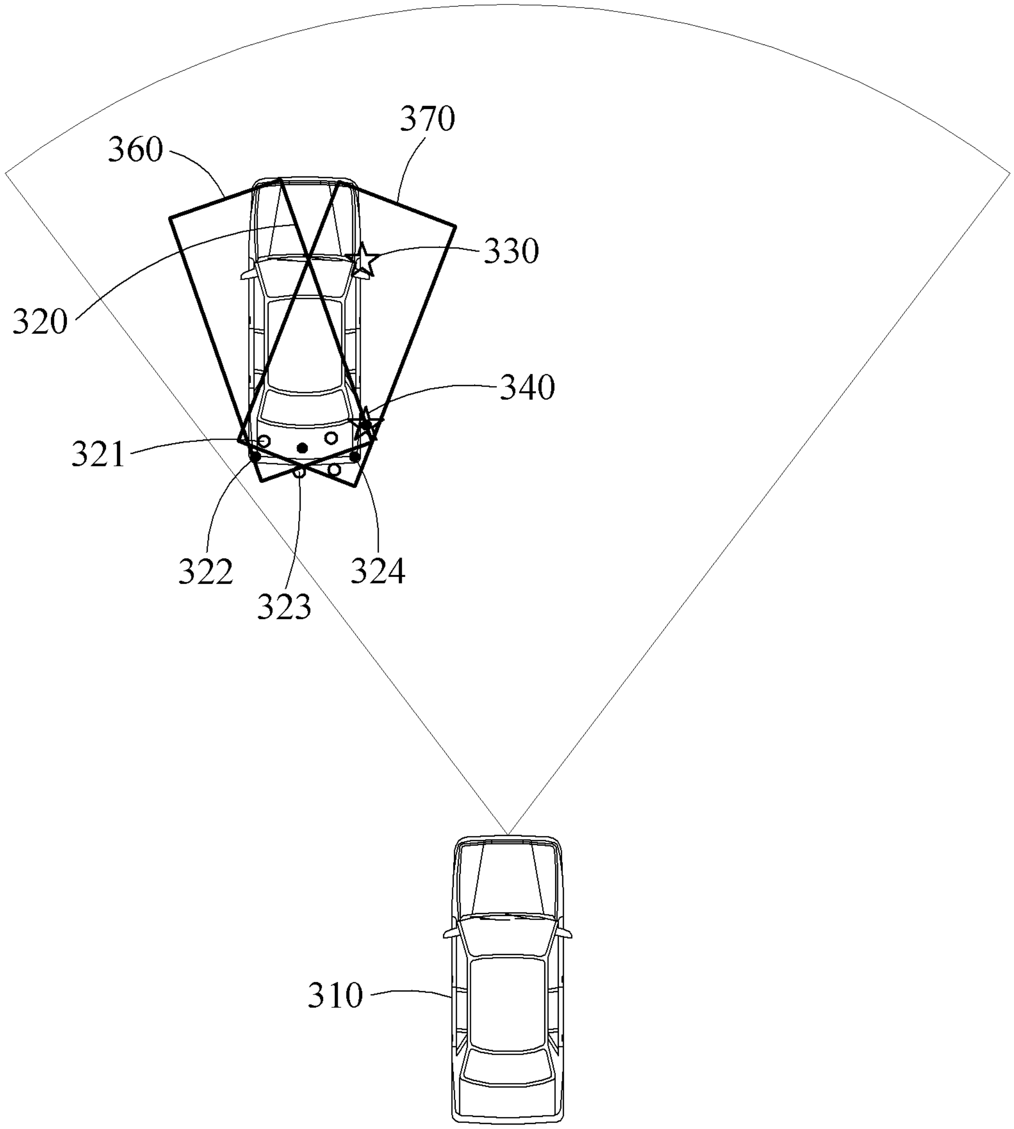
FIG. 3 illustrates an example of a method of determining a position and direction of a cut-in object based on a point.

FIG. 3 illustrates an example of a method of determining a position and direction of a cut-in object based on a point.

The processor 810 may generate and use information on the cut-in object based on the radar data. For example, the processor 810 may perform at least one of the distance FFT, the Doppler FFT, the CFAR detection, or the calculation of a DOA based on the radar data. In addition, information on a distance, velocity, and direction of each of the points (e.g., the points included in the point cloud) corresponding to the cut-in object may be obtained. The information on a target may be provided for various applications, such as autonomous driving, navigation, and guidance.

The radar signal processing method may be a method of detecting a candidate region of the cut-in object based on the point cloud through frequency analysis of the IF signal with respect to a distance, velocity, and azimuth angle. In addition, the method may estimate the position and direction of the cut-in object by clustering adjacent point clouds.

Due to the characteristics of the radar signal, time-variant point cloud data may be detected. In some examples, prediction accuracy of the accurate position and direction of the cut-in object may decrease. For example, a point cloud detected from a target vehicle measured at time t-1 and a point cloud of the target vehicle measured at time t may not be continuously connected. When estimating the position and moving direction of the target vehicle using such time-variant point cloud data, cut-in prediction performance may deteriorate.

Referring to FIG. 3, the point cloud of the cut-in object may include points 321 to 324. The processor 810 may generate a bounding box 360 or 370 of the cut-in object based on the point cloud. The processor 810 may predict the position or direction of the cut-in object based on the bounding box 360 or 370. However, the points included in the point cloud may have time-variant attributes. The time-variant attribute is an attribute in which a point exists at a specific time point and the point does not exist at another point of time. For example, a point a may exist at a time point t1, but the point a may not exist at a different point in time, time point t2. Accordingly, the points existing on the cut-in object may change at different times, and the position and direction of the bounding box may be changed as the points are changed. For example, at the time point t1, the points 321 and 323 may exist, the bounding box 370 may be generated, and the position and direction may be predicted, but at the time point t2, the points 321 and 323 may disappear, the points 322 and 324 may exist, and the bounding box 360 may be generated. In this example, the position and direction of the cut-in object rapidly changes, so that the position and direction of the cut-in object may be inaccurately predicted. In some examples, points corresponding to wheels 330 and 340 of the cut-in object may be time-invariant, i.e., the point may vary with a change or passage in time. Accordingly, the processor 810 may predict the position and direction of the cut-in object using a point having a time-invariant attribute.

FIG. 4 illustrates an example of a method of identifying a region where a cut-in object is positioned.

FIG. 4 has been described with reference to the of FIG. 1, and therefore, the detailed description of FIG. 4 is omitted here for brevity purposes. The description of FIG. 1 are incorporated herein by reference.

FIG. 5 illustrates an example of a method of transforming a three-dimensional coordinate system into a radar data coordinate system.

FIG. 5 has been described with reference to the of FIG. 1, and therefore, the detailed description of FIG. 5 is omitted here for brevity purposes. The description of FIG. 1 are incorporated herein by reference.

FIG. 6 illustrates an example of a method of separating a Doppler velocity corresponding to wheels.

FIG. 6 has been described with reference to the of FIG. 1, and therefore, the detailed description of FIG. 6 is omitted here for brevity purposes. The description of FIG. 1 are incorporated herein by reference.

Figure 7:
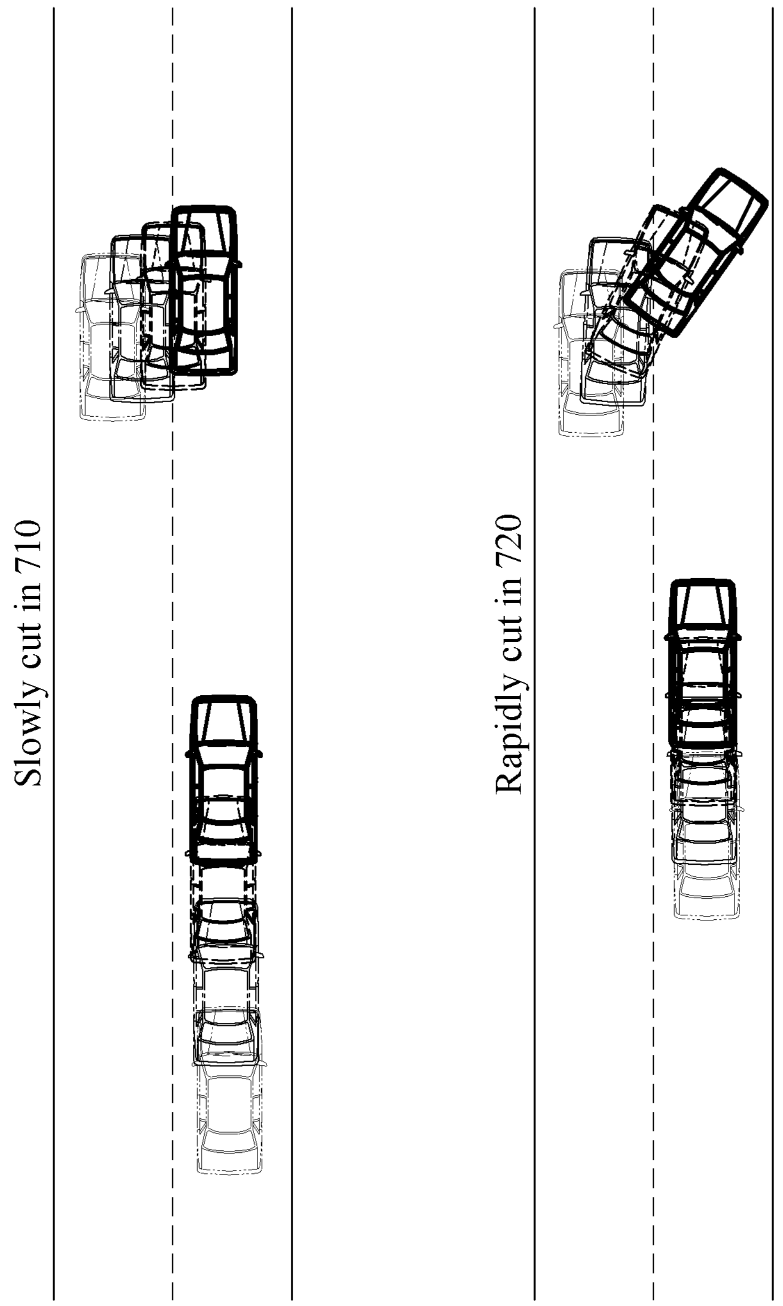
FIG. 7 illustrates an example of a method of determining a position of a cut-in object based on a movement of the cut-in object.

FIG. 7 illustrates an example of a method of determining a position of a cut-in object based on a movement of the cut-in object.

In some examples, when a distance between the driving vehicle and the cut-in object is greater than or equal to a reference distance or a threshold, the processor 810 may control the driving vehicle by applying a greater weight to the first movement information than to the second movement information. In some examples, the reference distance or the threshold may be determined based on the speed of the cut-in object entering a driving lane of the driving vehicle and the likelihood of the cut-in vehicle colliding with the driving vehicle. In some examples, the reference distance or the threshold may be determined based on whether the cut-in object rapidly enters a driving lane of the driving vehicle and whether it is likely to collide with the driving vehicle. In an example, referring to FIG. 7, 710 depicts a situation where the cut-in object slowly enters the driving lane of the driving vehicle. In this case, the processor 810 may control the driving vehicle by applying a greater weight to the first movement information. In another example, an angle formed by two wheels of the cut-in object distant from the driving vehicle may be small. In this case, the prediction accuracy of the direction of the cut-in object may decrease, and accordingly, the processor 810 may control the driving vehicle by applying a greater weight to the first movement information.

In some examples, when the velocity of the cut-in object is less than or equal to a reference velocity or a threshold, the processor 810 may control the driving vehicle by applying a greater weight to the second movement information than the first movement information. For example, referring to FIG. 7, 720 depicts a situation where the cut-in object rapidly enters the driving lane of the driving vehicle. In this example, the moving direction of the cut-in vehicle may be more important information than the distance between the driving vehicle and the cut-in object. Accordingly, the processor 810 may control the driving vehicle by applying a greater weight to the second movement information.

Figure 8:
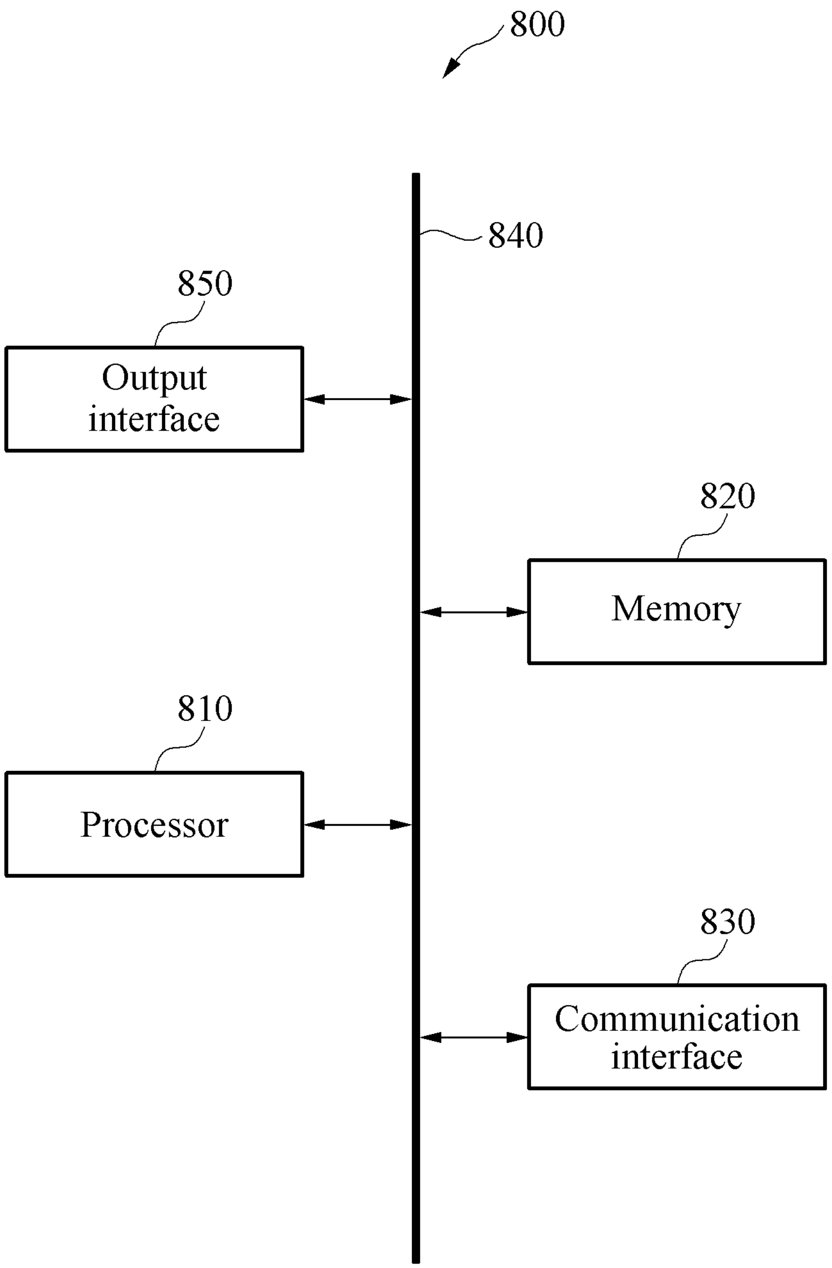
FIG. 8 illustrates an example of an electronic device.

FIG. 8 illustrates an example of an electronic device.

Referring to FIG. 8, an electronic device 800 may include the processor 810, a memory 820, a communication interface 830, and an output interface 850. The memory 820, the processor 810, the output interface 850, and the communication interface 830 may be connected to each other via a communication bus 840.

The electronic device 800 may be a device included in the driving vehicle. The processor 810 may perform the operations of the electronic device 800 and may execute corresponding processor-readable instructions for performing operations of the electronic device 800. The electronic device 800 may further include the radar device described above. The processor 810 may process radar data received from the radar device and store the radar data in the memory 820. The processor 810 may control an overall operation of the electronic device 800. The processor 810 may execute, for example, software, to control one or more hardware components of the electronic device 800 connected to the processor 810 and may perform various data processing or operations, and control of such components. The electronic device 800 may control the driving of the driving vehicle. The electronic device 800 may control the driving vehicle based on the movement of the cut-in object.

The memory 820 may store a variety of information generated in the processing process of the processor 810 described above. In addition, the memory 820 may store a variety of data and programs. The memory 820 may include, for example, a volatile memory or a non-volatile memory. The memory 820 may include a high-capacity storage medium such as a hard disk to store a variety of data.

The processor 810 may be a hardware-implemented device having a circuit that is physically structured to execute desired operations. The desired operations may include, for example, codes or instructions included in a program. The hardware-implemented device may include, but is not limited to, for example, a microprocessor, a central processing unit (CPU), graphics processing unit (GPU), a processor core, a multi-core processor, a multiprocessor, an application processor (AP), an application-specific integrated circuit (ASIC), a field-programmable gate array (FPGA), and a neural processing unit (NPU). Further details regarding the processor 810 are provided below.

In an example, as at least a part of data processing or operations, the processor 810 may store instructions or data in the memory 820, execute the instructions and/or process data stored in the memory 820, and store resulting data obtained therefrom in the memory 820. The processor 810 may be a data processing device implemented by hardware including a circuit having a physical structure to perform desired operations. For example, the desired operations may include code or instructions included in a program.

The memory 820 may store a variety of data used by components (e.g., the processor 810) of the electronic device 800. A variety of data may include, for example, computer-readable instructions and input data or output data for an operations related thereto. The memory 820 may include any one or any combination of a volatile memory and a non-volatile memory.

The volatile memory device may be implemented as a dynamic random-access memory (DRAM), a static random-access memory (SRAM), a thyristor RAM (T-RAM), a zero capacitor RAM (Z-RAM), or a twin transistor RAM (TTRAM).

The non-volatile memory device may be implemented as an electrically erasable programmable read-only memory (EEPROM), a flash memory, a magnetic RAM (MRAM), a spin-transfer torque (STT)-M RAM, a conductive bridging RAM(CBRAM), a ferroelectric RAM (FeRAM), a phase change RAM (PRAM), a resistive RAM (RRAM), a nanotube RRAM, a polymer RAM (PoRAM), a nano floating gate Memory (NFGM), a holographic memory, a molecular electronic memory device), or an insulator resistance change memory. Further details regarding the memory 1120 are provided below.

In some examples, the processor 810 may output the position of the cut-in object to the output device 830. In some examples, the output device 830 may provide an output of the speech to a user through auditory, visual, or tactile channels. The output device 830 may include, for example, a speaker, a display, a touchscreen, a vibration generator, and other devices that may provide the user with the output. The output device 830 is not limited to the example described above, and any other output device, such as, for example, computer speaker and eye glass display (EGD) that are operatively connected to the electronic device 800 may be used without departing from the spirit and scope of the illustrative examples described. In an example, the output device 830 is a physical structure that includes one or more hardware components that provide the ability to render a user interface, output information and speech, and/or receive user input.

The computing apparatuses, the electronic devices, the processors, the memories, and other components described herein with respect to FIGS. 1-8 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-7 that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD−Rs, CD+Rs, CD−RWs, CD+RWs, DVD-ROMs, DVD−Rs, DVD+Rs, DVD−RWs, DVD+RWs, DVD-RAMs, BD-ROMs, BD-Rs, BD-R LTHs, BD-Res, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A processor-implemented method of predicting a movement of a cut-in object, the method comprising:

Identifying a region where the cut-in object is positioned;

generating a plurality of points in a first coordinate system based on distance, direction of arrival (DOA), and velocity corresponding to the region, the plurality of points being determined from radar data;

determining a first velocity of the cut-in object by transforming the plurality of points of the first coordinate system into a second coordinate system based on time, frequency, and the velocity corresponding to the region;

separating a second velocity being a Doppler velocity corresponding to at least one wheel of the cut-in object from the second coordinate system based on the first velocity of the cut-in object;

determining at least one position of the at least one wheel of the cut-in object based on the points corresponding to the second velocity among the plurality of points of the first coordinate system;

generating at least one of first information related to a movement of the cut-in object or second information related to a direction of the cut-in object based on the at least one position of the at least one wheel;

determining an estimated position of the cut-in object based on at least one of the first information or the second information; and controlling a driving vehicle based on the estimated position of the cut-in object, wherein the identifying of the region of the cut-in object is performed before the separating of the second velocity.

2. The method of claim 1, wherein the radar data comprises a radio frequency signal reflected from the cut-in object from among pieces of radar data obtained from a radar device attached to the driving vehicle.

3. The method of claim 1, wherein the radar data is obtained by a frequency-modulated continuous-wave (FMCW) radar using a frequency modulated (FM) signal having a frequency that changes with time.

4. The method of claim 1, wherein the identifying of the region comprises:

calculating the distance to the plurality of points of the cut-in object based on the radar data;

calculating the velocity of each of the plurality of points based on the radar data;

identifying the region where the cut-in object is positioned in a target region based on the distance and the velocity; and calculating the DOA of each of the plurality of points.

5. The method of claim 4, wherein the calculating of the distance comprises:

calculating the distance to each of the plurality of points of the cut-in object through distance fast Fourier transform (FFT) based on the radar data.

6. The method of claim 4, wherein the calculating of the velocity comprises:

calculating the velocity of each of the plurality of points through Doppler FFT based on the radar data.

7. The method of claim 4, wherein the identifying of the region where the cut-in object is positioned comprises:

identifying the region where the cut-in object is positioned using constant false alarm rate (CFAR) detection.

8. The method of claim 1, wherein the determining of the first velocity of the cut-in object comprises:

clustering points adjacent to each other in the region; and determining the first velocity of the cut-in object based on a statistical value of a velocity corresponding to each of the clustered points.

9. The method of claim 1, wherein the second coordinate system is a radar data coordinate system.

10. The method of claim 1, wherein the separating of the second velocity corresponding to the at least one wheel comprises:

determining, as the second velocity, a velocity between the first velocity of the cut-in object and a value obtained by multiplying a ratio by the first velocity of the cut-in object.

11. The method of claim 1, wherein the first information is determined based on a distance between the driving vehicle and two wheels of the cut-in object positioned at a same side of the cut-in object.

12. The method of claim 1, further comprising:

controlling the driving vehicle by applying a greater weight to the first information than to the second information, in response to a distance between the driving vehicle and the cut-in object being greater than or equal to a threshold.

13. The method of claim 1, further comprising:

controlling the driving vehicle by applying a greater weight to the second information than to the first information, in response to the first velocity of the cut-in object being less than or equal to a threshold.

14. An electronic device comprising:

a radar device configured to provide radar data; and a processor configured to:

identify a region where a cut-in object is positioned;

generate a plurality of points of the cut-in object in a first coordinate system based on distance, direction of arrival (DOA), and velocity corresponding to the region, the plurality of points being determined from the radar data;

determine a first velocity of the cut-in object by transforming the plurality of points of the first coordinate system into a second coordinate system based on time, frequency, and the velocity corresponding to the region;

separate a second velocity being a Doppler velocity corresponding to at least one wheel of the cut-in object from the second coordinate system based on the first velocity of the cut-in object;

determine at least one position of the at least one wheel of the cut-in object based on points corresponding to the second velocity among the plurality of points of the first coordinate system;

generate at least one of first information related to a movement of the cut-in object or second information related to a direction of the cut-in object based on the at least one position of the at least one wheel;

determine an estimated position of the cut-in object based on at least one of the first information or the second information; and control a driving vehicle based on the estimated position of the cut-in object, wherein the identification of the region of the cut-in object is performed before the separation of the second velocity.

15. A processor-implemented method comprising:

identifying a region where a cut-in object is positioned;

generating a plurality of points of the cut-in object in a first coordinate system based on distance, direction of arrival (DOA), and velocity corresponding to the region, the plurality of points being determined from the radar data;

determining a first velocity of the cut-in object by transforming the plurality of points of the first coordinate system into a second coordinate system based on time, frequency, and the velocity corresponding to the region;

determining a second velocity being a Doppler velocity corresponding to at least one wheel of the cut-in object from the second coordinate system based on the first velocity of the cut-in object;

determining at least one position of the at least one wheel of the cut-in object based on points corresponding to the second velocity among the plurality of points of the first coordinate system;

generating at least one of first information related to a movement of the cut-in object or second information related to a direction of the cut-in object based on the at least one position of the at least one wheel;

determining an estimated position of the cut-in object based on at least one of the first information or the second information; and controlling a driving vehicle based on the estimated position of the cut-in object, wherein the identifying of the region of the cut-in object is performed before the determining of the second velocity.

16. The method of claim 15, wherein the at least one wheel comprises a first wheel and a second wheel, and the moving direction of the cut-in object is based on an angle formed by the first wheel and the second wheel with a direction of the movement of the cut-in object.

* * * * *